(12) United States Patent
Beckley et al.

(10) Patent No.: US 8,880,653 B2
(45) Date of Patent: Nov. 4, 2014

(54) FILE TRANSFER SYSTEM AND METHOD FOR MONITORING AND MANAGEMENT OF REMOTE DEVICES

(75) Inventors: Keith Beckley, King City (CA); Phil Sikora, Unionville (CA); Basil Allos, Newmarket (CA)

(73) Assignee: Novx Systems Canada, Inc., Richmond Hill, ON (CA)

( * ) Notice: Subject to any disclaimer, the term of this patent is extended or adjusted under 35 U.S.C. 154(b) by 142 days.

(21) Appl. No.: 13/280,805

(22) Filed: Oct. 25, 2011

(65) Prior Publication Data

US 2012/0110136 A1    May 3, 2012

Related U.S. Application Data

(60) Provisional application No. 61/407,314, filed on Oct. 27, 2010.

(51) Int. Cl.
| | | |
|---|---|---|
| *G06F 15/16* | (2006.01) | |
| *H04L 12/26* | (2006.01) | |
| *H04L 29/08* | (2006.01) | |

(52) U.S. Cl.
CPC ............. *H04L 43/04* (2013.01); *H04L 67/06* (2013.01); *H04L 43/0817* (2013.01); *H04L 67/025* (2013.01)
USPC .......................................... 709/219; 709/203

(58) Field of Classification Search
None
See application file for complete search history.

(56) References Cited

U.S. PATENT DOCUMENTS

| | | | |
|---|---|---|---|
| 6,148,334 A * | 11/2000 | Imai et al. ................ 709/219 |
| 6,266,678 B1 * | 7/2001 | McDevitt et al. ................ 1/1 |
| 6,377,162 B1 | 4/2002 | Delestienne et al. |
| 7,082,460 B2 * | 7/2006 | Hansen et al. ................ 709/220 |
| 7,117,239 B1 | 10/2006 | Hansen |
| 7,149,792 B1 | 12/2006 | Hansen et al. |
| 7,185,014 B1 | 2/2007 | Hansen |
| 2004/0095237 A1 * | 5/2004 | Chen et al. ................ 340/506 |
| 2006/0217115 A1 * | 9/2006 | Cassett et al. ................ 455/423 |
| 2006/0280207 A1 * | 12/2006 | Guarini et al. ................ 370/524 |
| 2007/0011295 A1 * | 1/2007 | Hansen ................ 709/223 |
| 2007/0150903 A1 | 6/2007 | Hansen |
| 2007/0198661 A1 * | 8/2007 | Hansen ................ 709/219 |
| 2007/0288629 A2 | 12/2007 | Taylor et al. |
| 2009/0271002 A1 * | 10/2009 | Asofsky ................ 700/3 |
| 2010/0005344 A1 | 1/2010 | Gyles et al. |

\* cited by examiner

*Primary Examiner* — Farid Homayounmehr
*Assistant Examiner* — Maung Lwin
(74) *Attorney, Agent, or Firm* — Lynn C. Schumacher; Stephen W. Leonard; Hill & Schumacher

(57) ABSTRACT

A remote computing device associated with a remote apparatus obtains information related to the apparatus, and generates a file containing the information. The file is uploaded to a file transfer server. An apparatus management and computing system monitors the file transfer server and identifies newly generated and uploaded files. The files are downloaded and parsed to extract the information related to the remote apparatus. The parsed information is stored in a database and made available to a user through a monitor application. The system may be configured for the monitoring of multiple remote apparatuses. The remote computing device associated with a given remote apparatus may also monitor the file transfer server and obtain instruction files generated and uploaded by the apparatus management and computing system.

24 Claims, 8 Drawing Sheets

FILE TRANSFER SYSTEM AND METHOD FOR MONITORING AND MANAGEMENT OF REMOTE DEVICES

CROSS-REFERENCE TO RELATED APPLICATION

This application claims priority to U.S. Provisional Application No. 61/407,314, titled "FILE TRANSFER SYSTEM AND METHOD FOR MONITORING AND MANAGEMENT OF REMOTE DEVICES" and filed on Oct. 27, 2011, the entire contents of which are incorporated herein by reference.

BACKGROUND

This disclosure relates to systems and methods for monitoring and managing remote devices. More particularly, the present disclosure relates to methods of remotely monitoring and managing remote diagnostic analyzers over a network.

Many diverse technologies require or benefit from the remote monitoring and/or management of deployed equipment, including telecommunications systems, media devices, security systems, defense equipment, medical devices, vending devices, and remote sensing devices. In particular, remote monitoring supports the remote reporting of error codes and fault conditions, which can alert an administrator to the need for maintenance, troubleshooting, and a loss of revenue-generating capabilities.

In addition to error code and fault condition reporting, remote management can provide a host of other applications, including the ability to remotely download status information, usage statistics, the results of operations and measurements, and also the ability to remotely upload firmware updates, new content, and configuration information.

The ability to form a connection across a network for remote management purposes is often prohibited by the existence of a firewall or complicated by the need to communicate across a local network. U.S. Pat. No. 7,117,239, issued to Hansen, describes a method of overcoming such problems by providing a system that facilitates communication through the exchange of messages between a remote apparatus (with an embedded communication device) and a server.

Specifically, the system disclosed by Hansen enables a direct information exchange between the apparatus and server, either by the exchange of email messages or HTTP commands. Unfortunately, such implementations require a direct messaging-type protocol for the exchange of information between the apparatus and the server. Such configurations are highly limiting in their overall architecture, and add complexity to the apparatus by requiring the presence of an email client of a session-based HTTP messaging client. Furthermore, the message container employed for encapsulating and transmitting data can lead to problems associated with high bandwidth requirements.

SUMMARY

The aforementioned limitations are addressed by embodiments of the present disclosure, which provide systems and methods of the remote monitoring and management of an apparatus using file transfer. Such embodiments provide a highly flexible approach to remote management and monitoring by enabling the indirect transfer of information between a central computing system and a remote apparatus through an intermediary file transfer server. The resulting system is robust, highly scalable, and generates minimal bandwidth overhead due to the efficiency and simplicity of the file transfer approach.

Accordingly, in a first aspect, there is provided a computer implemented method of monitoring a remote apparatus, the method comprising the steps of: initiating a file transfer session with a file transfer server; identifying, on the file transfer server, a file associated with a status of the remote apparatus, the file having been uploaded by a remote computing device associated with the remote apparatus; requesting transfer of the file; downloading the file; parsing the file to extract information associated with the remote apparatus; and storing the information associated with the remote apparatus.

In another aspect, there is provided a computer implemented method of managing a remote apparatus, the method comprising the steps of: initiating a file transfer session with a file transfer server; and uploading an instruction file to the file transfer server, wherein the instruction file includes one or more instructions to be carried out by a remote computing device associated with the remote apparatus; wherein the instruction file is identifiable to the remote computing device and uploadable from the file transfer server by the remote computing device.

In another aspect, there is provided a method of communicating information associated with the status of a remote apparatus to a server, the method including the steps of: locally monitoring the status of the remote apparatus; generating a file including information associated with the status of the remote apparatus; initiating a file transfer session with a file transfer server; and uploading the file to the file transfer server.

In another aspect, there is provided a system for monitoring a remote apparatus, the remote apparatus being connected to a remote computing device configured to monitor the remote apparatus, the system comprising: a file transfer server configured for communicating across a network with the remote computing device and for receiving a file uploaded from the remote computing device, wherein the file pertains to a status of the remote apparatus; and an apparatus management computing system configured to communicate with said file transfer server to identify and download the file, and to parse the file and extract information associated with the remote apparatus.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "database" shall mean any collection of data stored together and organized for search and retrieval, including without limitation flat file databases, fielded databases, full-text databases, object-oriented databases, and relational databases.

Figure 1:
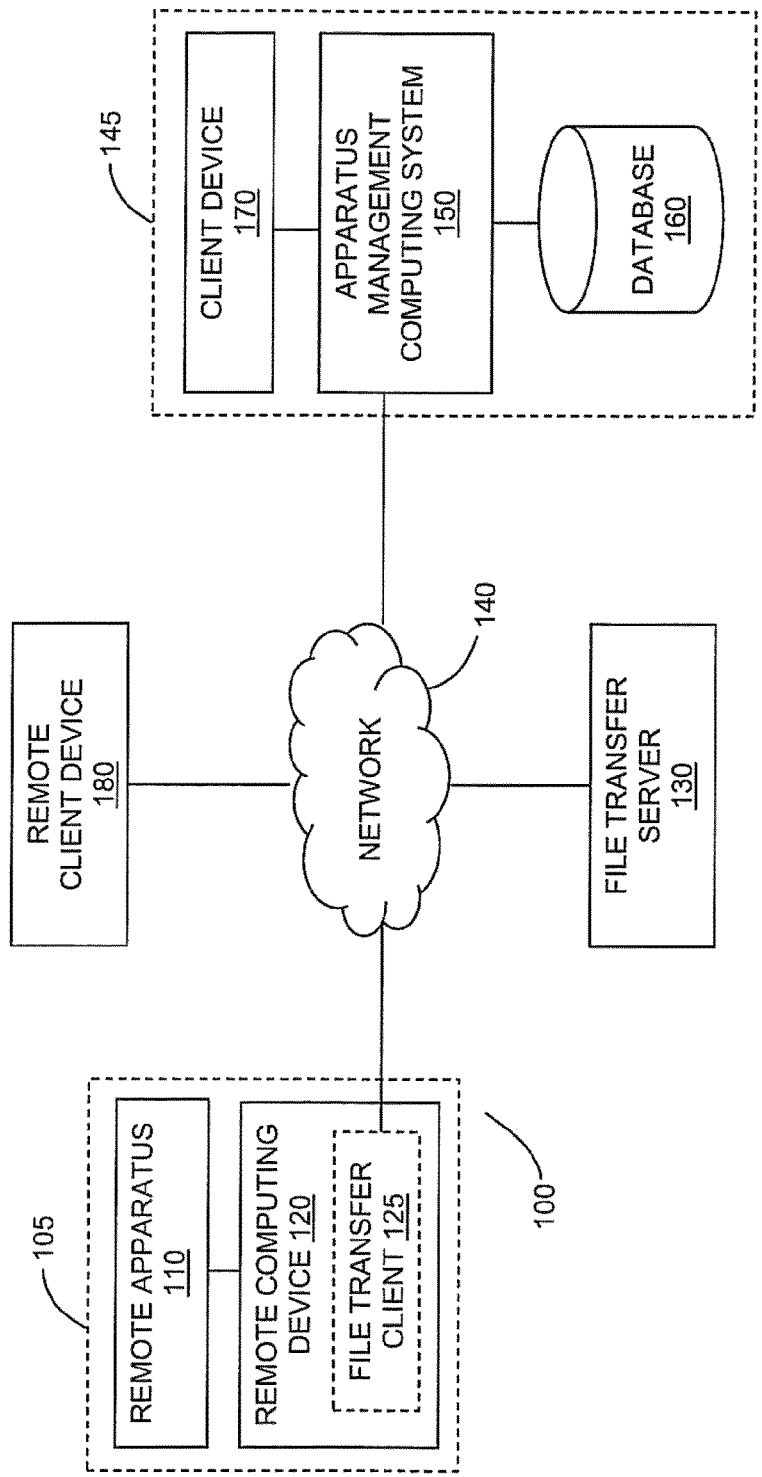
FIG. 1 shows a system for monitoring and/or managing a remote apparatus.

A system for the management and monitoring of a remote apparatus is shown in FIG. 1. The system 100 includes remote subsystem 105, including a remote apparatus 110 and remote computing device 120. Remote computing device includes file transfer client 125 and a memory (such as an internal memory), is connected to file transfer server 130 through network 140, and may upload files to file transfer server 130 via file transfer client 125 as further described below. Network 140 may be a local network, but in one embodiment, network 140 is an external network such as the internet. It is to be understood that system 100 (and other systems disclosed and illustrated herein) may further include additional networking elements that are not shown, such as routers, gateways, and firewalls, to name but a few such components.

Remote apparatus 110 performs at least one function that is monitored by remote computing device 120. Remote computing device 120 may communicate with apparatus 105 according to a wide variety of implementations. Remote apparatus 110 may itself include a processor that internally monitors one or more parameters related to its function, in which case the monitored parameters are provided to or obtained by remote computing device 120. Monitored parameters may include a wide range of values and data types, including, but not limited to, parameters relating to the present status of remote apparatus 110, errors and/or error codes, firmware version information, results obtained after performing a calculation and/or measurement, user related information such as user input, and information relating to number of times that a certain function has been executed.

Remote subsystem 105 may be a single remote device, such as an apparatus having an embedded processor and/or controller that functions at least in part as a file transfer client. Alternatively, remote subsystem 105 may include remote apparatus 110, and a separate computing device, such as a personal computer, that includes remote computing device 120 and is externally connected (for example, through a communications bus or a local network) to remote apparatus 110.

Figure 2:
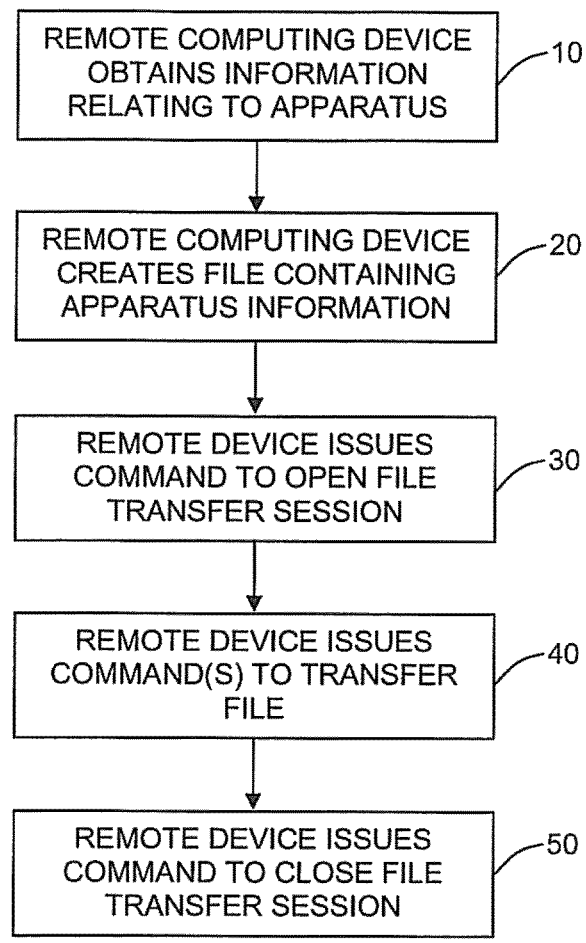
FIG. 2 is a flow chart illustrating a method of uploading a file from a remote computing device associated with a remote apparatus to a file server.

Referring now to FIG. 2, a flow chart is provided illustrating the process in which remote computing device 120 connects to file transfer server 130 for uploading files to file transfer server 130. In step 10, remote computing device obtains information relating to remote apparatus 110, where the information is to be employed for remote management, monitoring, or other purposes related to apparatus 110 as described above. Information to be uploaded from remote computing device 120 to file transfer server 130 may include any of a wide variety of types of information, including, but not limited to, information useful for apparatus status monitoring, reporting an activity history, reporting configuration and/or setup parameters, diagnostic monitoring, providing error codes and/or fault status, documenting use, providing use statistics (for example, the usage of consumables with the apparatus, where the usage may be described in terms of serial numbers of consumables), sending results of calculations and/or measurements, and verifying properties such as firmware version and apparatus identification information.

Remote computing device 120 generates a file containing the apparatus specific information in step 20 and may store the file in a memory location, such as an internal memory or local storage media. The file may include any suitable format for containing information related to apparatus 110.

The generated file may be constructed according to a markup language, such as extendable markup language (XML). Illustrative examples of suitable files are provided in the examples below.

In step 30, file transfer client 125 transmits a command across network 140 to file transfer server 130 to open a file transfer session. In the specific example where the file transfer protocol is FTP, a command for establishing the file transfer session may be:

ftp open [address] [account name] [password]

After having established the file transfer session, file transfer client 125 orchestrates the transfer of the generated file in step 40. For example, an appropriate FTP command for transmitting the file to the file transfer server is:

ftp put [filename]

Finally, in step 50, file transfer client 125 closes the file transfer session. This step is optional, as it is not necessary to close the session. Typically, an open session will time out after a specified time duration. For example, an appropriate FTP command for closing the file transfer session is:

ftp bye

Files containing information relating to apparatus 110 may be uploaded to file transfer server on a periodic basis, or alternatively in response to a specific event as determined by remote computing device. For example, files may be uploaded to describe the status of apparatus 110 after a power up event is detected, or in response to the detection of an error code or fault state.

Referring again to FIG. 1, central processing environment 145 is also connected to file transfer server 130 through network 140. Specifically, processing environment 145 includes apparatus management computing system 150, which indirectly obtains and processes files relating to remote apparatus 110 from file transfer server 130. Apparatus management computing system processes files obtained from file transfer server 130 and stores data relating to processed files, for example, in a local storage medium (such as a hard disk drive), or database 160. Although database 160 is shown as a local database, it is to be understood that database 160 may reside on a physically separate computer or server, and may connect to apparatus management and computing system 150 through a network, such as network 140, or a local network. In an alternative embodiment, database 160 may reside on file transfer server 130.

Central processing environment 145 may further include a client device 170, such as a monitor and/or user input/output device, for providing information related to apparatus 110 to an administrative user. System 100 may further include one or more remote client devices 180 that are remote from central computing environment 145 and are accessed through network 140 for the remote monitoring and/or management of apparatus 110. In one embodiment, remote client device may be physically located local to remote apparatus 110, thus enabling the local monitoring and/or management of apparatus 110 based on information processed by central processing environment 145.

Figure 3:
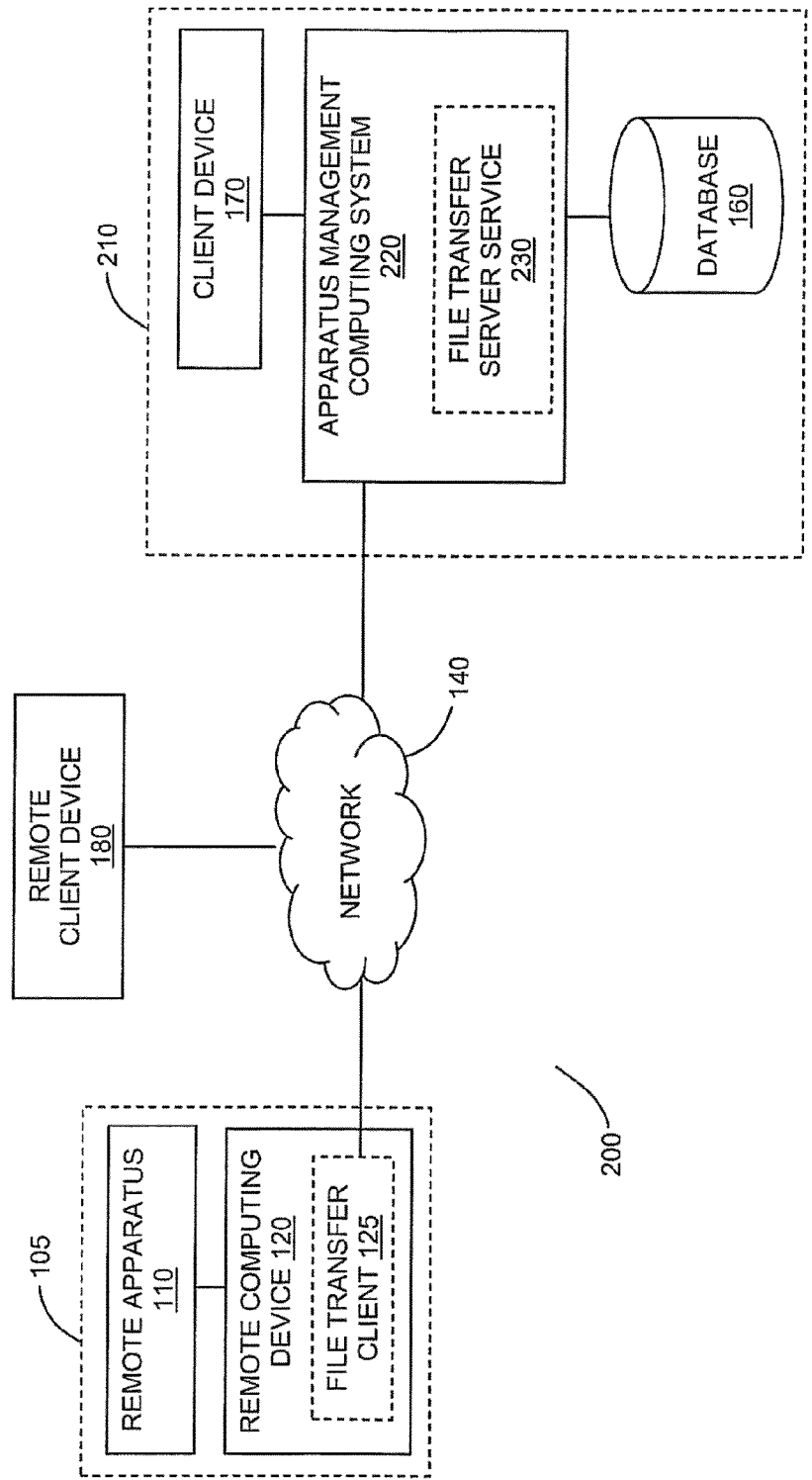
FIG. 3 shows a system for monitoring and/or managing a remote apparatus with an integrated file transfer server.

File transfer server 130 may be provided as an externally networked computing device, such as a dedicated server, as shown in FIG. 1. However, it is to be understood that file transfer server may be integrated with central processing environment 145. FIG. 3 illustrates such an alternative system 200 in which integrated central processing environment 210 includes file transfer server 230, which operates in the service layer on apparatus management and computing system 220.

Figure 4:
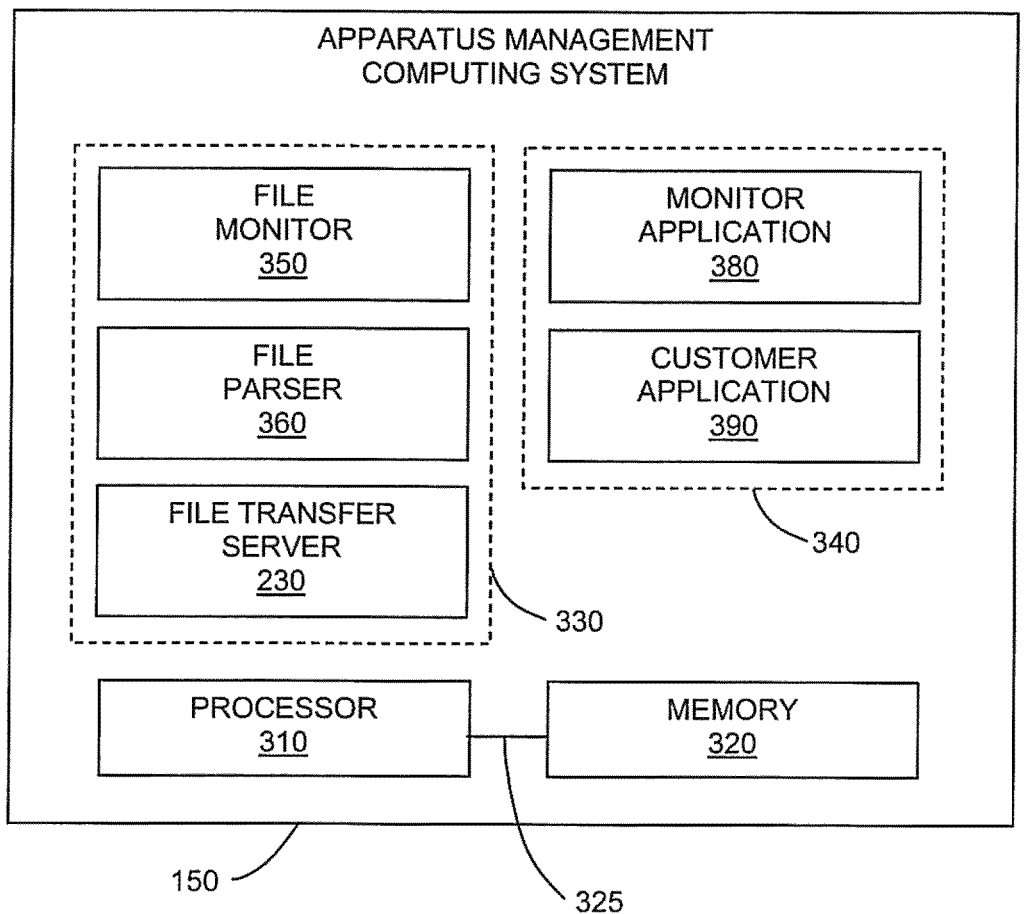
FIG. 4 illustrates components of the physical, application and service layers of the apparatus management and computing system.

Referring now to FIG. 4, one embodiment of apparatus management and computing system is shown at 150. Apparatus management and computing system 150 may include a processor 310 and memory 320, connected through bus 325, for processing files uploaded from the file transfer server service. The system further includes service layer 330 and application layer 340. Service layer 330 may include file monitor service 350, file parser service 360, and may optionally include file transfer server 370 (as discussed above and illustrated in FIG. 3). Application layer 340 may include monitor application 380 and may further include customer application 390.

Figure 5:
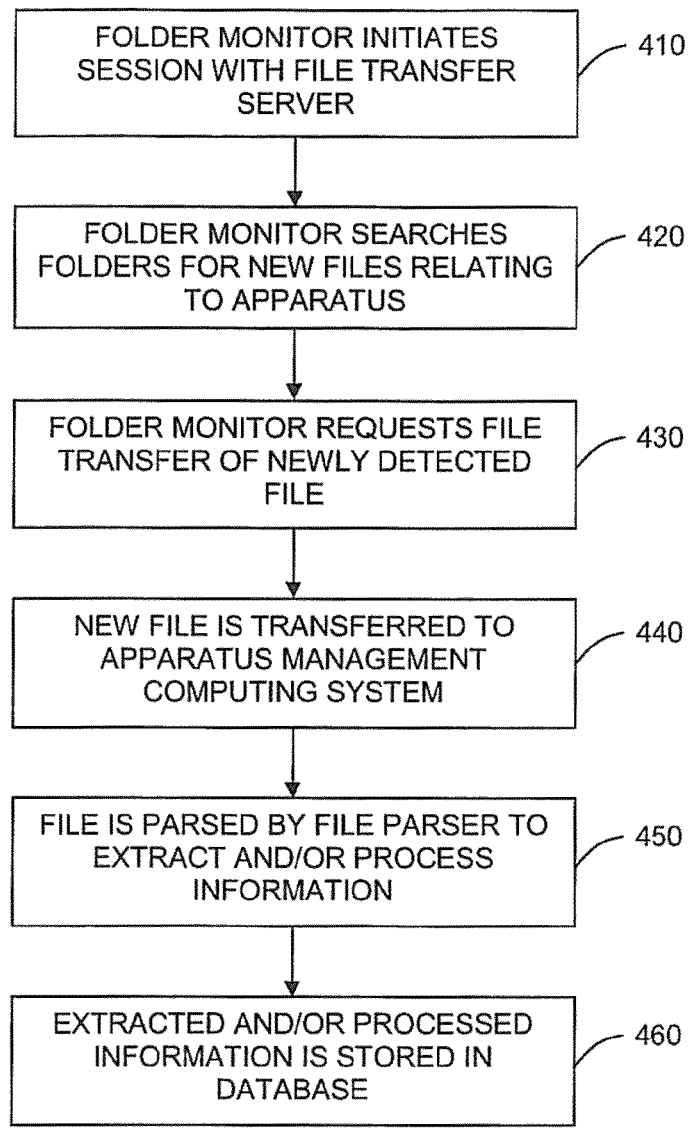
FIG. 5 is a flow chart illustrating a method of identifying a file associated with a remote apparatus, where the file resides on the remote server, obtaining the file, and parsing the file to extract information related to the remote apparatus.

FIG. 5 illustrates the steps followed to obtain and process a file from file transfer server 130 and store extracted or processed data. File monitor service 350 coordinates communication with file transfer server 130 (or integrated file transfer server service 230) to detect and transfer files containing information related to apparatus 110. In step 410, file monitor 350 initiates a file transfer session and examines the contents of one or more folders or directories (henceforth referred to commonly as "folders") accessible on file transfer server 130. File monitor 350 may maintain a continuous session with file transfer server 130 or periodically initiates and subsequently terminates sessions with file transfer server 130. The frequency at which files on file transfer server are searched by file monitor 350 may be similar to or matched to a frequency at which information is uploaded to file transfer server 130 by file transfer client 125.

In step 420, file monitor searches for the presence of files uploaded from apparatus 110 in step 420. File monitor 350 may search for and detects new files relating to apparatus 110 according to file creation time stamp information.

Alternatively, newly uploaded files may be detected by comparing the contents of file transfer server to a list of previously detected files. An operating system service may be used to detect any change in a folder on a file system. This service notifies the file monitor service and a record in a database table of the new file is created with the file path and a time stamp. Records can be created for simultaneous incoming files across a multitude of directories.

If file monitor 350 detects that a new file related to apparatus 110 has been uploaded to file transfer server 130, then in step 430, file monitor 350 sends a request to file transfer server 130 to transfer the file. The file is then transferred in step 440, and may be stored in memory 320.

In step 450, the transferred file is processed by file parsing service 360. File parser 360 processes files obtained by the file monitoring service. File parser 360 may also sort and/or prioritizing files obtained by file monitor 350 prior to file processing operations. File parser extracts and/or processes information from the file. The specific nature of the extraction and/or processing steps will depend on the details of the system, and the type of information that is relayed from apparatus 110. Information extracted by file parser 360 may be stored in database 160. The transferred file and/or extracted information may also be locally stored in a storage medium, or archived on an external storage device.

In one embodiment, file parser 360 examines one or more fields within the file and parses one or more field elements into a separate data structure, such as a table. A specific, yet non-limiting example of a file parsing operation is provided below, in which the apparatus is a diagnostic analyzer that performs measurements (assays) on samples to determine the concentration of an analyte. At regular intervals, a status file is generated by a processor embedded within the analyzer, and an FTP client residing with the analyzer uploads the generated status file to an FTP server. An example of a status file, provided in XML, is shown below:

```
<novxstatus compression="">
<header unitid="001002" mfg="2006/06/21" structureid="7"
date="26/10/2010" time="17:17" crc="DFAD61E6" />
<status
operatorid="45"
uptime="76594"
errorstatus1="0"
errorstatus2="0"
fwmain="4.42.0"
fwmainboot="3.03.0"
/>
<action
statuscode="0" runidletime="72" timeleft="0" sample="14"
batchid="" />
<swconfig value="8388608" />
<hwconfig value="2146435072" />
<rasconfig value="69631" />
<netconfig value="1536" />
<criticalerror1 value="0" />
<criticalerror2 value="0" />
<systemwarning1 value="4" />
<consumable consumablestoreplace="16" reag1="2" reag2="0"
reac1="2" reac2="0" tipr="0" stip="16" sdis="16"
sisecal="0" sisewash="0" siserinse="0" />
<inventory count="213" maxinstatus="56" countinsystem="213"
maxtracereports="3" >
  <inventoryitem inventorystr="20101026 10:44 014 OK    SD " />
  <inventoryitem inventorystr="20101026 13:54 015 OK    SD " />
  <inventoryitem inventorystr="20101026 15:06 016 OK    SD " />
  <inventoryitem inventorystr="20101026 15:06 017 OK    S  Uploaded" />
  <inventoryitem inventorystr="20101026 13:54 018 OK    S  Uploaded" />
  <inventoryitem inventorystr="20101026 10:44 019 OK    S  Uploaded" />
  <inventoryitem inventorystr="20101026 09:11 020 OK    S  Uploaded" />
  <inventoryitem inventorystr="20101025 17:32 021 OK    S  Uploaded" />
  <inventoryitem inventorystr="20101025 16:15 022 OK    S  Uploaded" />
```

-continued

```
<inventoryitem inventorystr="20101025 14:13 023 OK  S  Uploaded" />
<inventoryitem inventorystr="20101025 12:01 024 OK  S  Uploaded" />
<inventoryitem inventorystr="20101025 10:32 025 OK  S  Uploaded" />
<inventoryitem inventorystr="20101025 08:50 026 OK  S  Uploaded" />
<inventoryitem inventorystr="20101022 14:26 027 OK  S  Uploaded" />
<inventoryitem inventorystr="20101022 12:23 028 OK  S  Uploaded" />
<inventoryitem inventorystr="20101022 10:47 029 OK  S  Uploaded" />
<inventoryitem inventorystr="20101022 09:26 030 OK  S  Uploaded" />
<inventoryitem inventorystr="20101021 17:24 031 OK  S  Uploaded" />
<inventoryitem inventorystr="20101021 16:07 032 OK  S  Uploaded" />
<inventoryitem inventorystr="20101021 14:47 033 OK  S  Uploaded" />
<inventoryitem inventorystr="20101021 13:10 034 OK  S  Uploaded" />
<inventoryitem inventorystr="20101021 11:50 035 OK  S  Uploaded" />
<inventoryitem inventorystr="20101021 10:44 036 OK  S  Uploaded" />
<inventoryitem inventorystr="20101021 09:24 037 OK  S  Uploaded" />
<inventoryitem inventorystr="20101021 07:56 038 OK  S  Uploaded" />
<inventoryitem inventorystr="20101020 12:41 039 OK  S  Uploaded" />
<inventoryitem inventorystr="20101020 09:37 040 OK  S  Uploaded" />
<inventoryitem inventorystr="20101020 07:59 041 OK  S  Uploaded" />
<inventoryitem inventorystr="20101019 16:27 042 OK  S  Uploaded" />
<inventoryitem inventorystr="20101019 14:27 043 OK  S  Uploaded" />
<inventoryitem inventorystr="20101019 11:14 044 OK  S  Uploaded" />
<inventoryitem inventorystr="20101019 10:03 045 OK  S  Uploaded" />
<inventoryitem inventorystr="20101019 08:58 046 OK  S  Uploaded" />
<inventoryitem inventorystr="20101019 07:48 047 OK  S  Uploaded" />
<inventoryitem inventorystr="20101018 16:44 048 OK  S  Uploaded" />
<inventoryitem inventorystr="20101018 14:43 049 OK  S  Uploaded" />
<inventoryitem inventorystr="20101018 13:08 050 OK  S  Uploaded" />
<inventoryitem inventorystr="20101018 11:59 051 OK  S  Uploaded" />
<inventoryitem inventorystr="20101018 10:32 052 OK  S  Uploaded" />
<inventoryitem inventorystr="20101018 09:30 053 OK  S  Uploaded" />
<inventoryitem inventorystr="20101018 08:02 054 OK  S  Uploaded" />
<inventoryitem inventorystr="20101015 14:13 055 OK  S  Uploaded" />
<inventoryitem inventorystr="20101015 12:52 056 OK  S  Uploaded" />
</inventory>
</novxstatus>
```

The above XML file contains a number of tagged sections. The first section contains the header information for the file such as date, analyzer ID, date of manufacture, and cyclic redundancy check (CRC) for error checking. A status section identifies the currently running software versions, error conditions and operation status (e.g. idle, running, loading). A configuration section details the setting of all the parameters that can be used to configure the analyzer. An inventory section displays a listing of the most recent batches and any older batches that have not been successfully uploaded.

As described above, in one example implementation, file monitoring service 350, running on a central server such as apparatus management computing system 220, regularly interrogates the FTP server to determine whether or not new files have been uploaded by the analyzer. When the above status file is detected, a request is sent to the FTP server for the file to be transmitted to the central server.

After having obtained the status file, the file parser server parses the file and extracts information related to several fields, elements or entries within the file. The parsed contents may be employed to populate entries in a database (e.g. database 160). According to the present example, a database entry is made that includes the information parsed from the status file.

In the present example, data fields related to the status of the analyzer, inventory, and configuration are extracted from the XML tags and stored in individual fields in a database. Two example forms of parsing are as follows. The XLM file can be opened and each individual tag is extracted and the contents between the tags are saved. Alternatively, native SQL can be used to directly parse the data one or more tables, as illustrated in the following code:

```
ALTER PROCEDURE [dbo].[spFileQueueAutoCalProcess]
(    @XMLdoc      ntext,
     @sFileTypeName nvarchar(50),
     @sFileName    nvarchar(50),
     @dFileDate    datetime,
     @iFileSize    numeric(12, 2)
)
AS
BEGIN
Declare   @idoc                              int,
          @UnitID                            int,
          @TransferID                        int,
          @iFileTypeID                       int,
          @FileDate                          datetime
DECLARE @AutoCalID         int
-- Table variables to store info from XML
Declare @TempAutoCal Table
(
     TransferID          int,
     StructureID         nvarchar(12),
     FileDate            datetime,
     CRC                 nvarchar(10),
     Compression         nvarchar(50),
     Date                nvarchar(12),
     [Time]              nvarchar(12),
     MFGDate                     nvarchar(12),
     UnitID                      nvarchar(8),
     Entries                     nvarchar(4)
)
DECLARE @TempAutoCalItems Table
(
     PanelID                     nvarchar(20),
     CalNumber                   nvarchar(20),
     Batch                       nvarchar(10),
     Cals                        nvarchar(4),
     LastDate                    nvarchar(20),
     CalDate                     nvarchar(20),
     CreatedDate                 nvarchar(20)
)
-- Create an internal representation of the XML document.
     EXEC SP_XML_PREPAREDOCUMENT @idoc OUTPUT,
     @XMLdoc
     INSERT INTO @TempAutoCal
     SELECT NULL, StructureID, NULL, CRC, Compression,
Date, Time, MFGDate, UnitID, NULL
     FROM OPENXML (@idoc,'/novxcal/header',1)
     WITH(
          TransferID          int,
          StructureID         nvarchar(12)
'@structureid',
          FileDate            datetime,
          CRC                 nvarchar(10)
'@crc',
          Compression         nvarchar(50)
'../@compression',
          Date                nvarchar(12)
'@date',
          [Time]              nvarchar(12)
'@time',
          MFGDate             nvarchar(12)
          '@mfg',
          UnitID              nvarchar(8)
               '@unitid',
          Entries             nvarchar(4)
     )
     UPDATE @TempAutoCal
     SET Entries = (SELECT entries FROM OPENXML
(@idoc,'/novxcal/caltabledatabase',1) WITH ( entries
varchar(8) '@entries'))
     INSERT INTO @TempAutoCalItems (PanelID, CalNumber,
Batch, Cals, LastDate, CalDate, CreatedDate)
     SELECT t1.PanelID, t1.CalNumber, t1.Batch, t1.Cals,
t1.LastDate, t1.CalDate, t1.CreatedDate
     FROM OPENXML
(@idoc,'/novxcal/caltabledatabase/calibrationtable/collection',
1)
     WITH(
          PanelID                nvarchar(20)
          '@panel',
               CalNumber         nvarchar(20)
          '@calibrationnumber',
```

-continued

```
            Batch          nvarchar(10)     '@batch',
            Cals           nvarchar(4)
    '@cals',
            LastDate       nvarchar(20)     '@last',
            CalDate        nvarchar(20)
    '@cal',
            CreatedDate    nvarchar(20)
    '@created'
    ) AS t1
        EXEC sp_xml_removedocument @idoc
        SELECT @iFileTypeID = FileTypeID
        FROM tFileType
        WHERE   FileStructureXML = @sFileTypeName
        SELECT top 1 @UnitID = UnitID FROM tiMDxUnit
        WHERE Description = 'iMDx' AND UnitSerialNumber =
(Select top 1 UnitID From @TempAutoCal)
        INSERT INTO dbo.tiMDxTransfer (UnitID, TransferDate,
FileTypeID, TransferStatus, [FileName], FileDate, FileSize
)
                VALUES (@UnitID,
GetDate( ),@iFileTypeID,1,@sFileName, CAST(@dFileDate AS
datetime), @iFileSize)
        SET @TransferID = @@IDENTITY
        IF NOT @TransferID = 0 AND @TransferID IS NOT NULL
            begin
                INSERT INTO tFileContent (TransferID
,FileContent) VALUES (@TransferID, @XMLdoc)
            Set Dateformat dmy
            select @FileDate=
CONVERT(DATETIME,(CAST(MONTH(Date) AS
VARCHAR(2))+'/'+CAST(DAY(Date) AS
VARCHAR(2))+'/'+CAST(YEAR(Date) AS VARCHAR(4))+' '+
CAST(Time AS VARCHAR(12))),101)
            FROM    @TempAutoCal
                UPDATE @TempAutoCal SET TransferID = @TransferID,
FileDate = @FileDate
            end
        IF (SELECT COUNT(*) FROM @TempAutoCal) = 1 AND
@TransferID > 0
            begin
                INSERT INTO tAutoCal (TransferID, UnitID,
StructureID, FileDate, MFGDate, CRC, Compression, Entries)
                SELECT t1.TransferID, t1.UnitID, t1.StructureID,
@FileDate, CASE ISDATE(t1.MFGDate) WHEN 1 THEN
CAST(t1.MFGDate As datetime) ELSE NULL END
                , t1.CRC, t1.Compression, CASE
ISNUMERIC(t1.Entries) WHEN 1 THEN Cast(t1.Entries As int)
ELSE NULL END
                FROM @TempAutoCal t1
                SET @AutoCalID = @@IDENTITY
            end
        IF NOT @AutoCalID = 0 AND @AutoCalID IS NOT NULL
            begin
                INSERT INTO [tAutoCalItems] ([AutoCalID],
[PanelID], [CalNumber], [Batch], [Cals], [LastDate],
[CalDate], [CreatedDate])
                SELECT @AutoCalID, t1.[PanelID], t1.[CalNumber],
t1.[Batch], t1.[Cals], t1.[LastDate], t1.[CalDate],
t1.[CreatedDate]
                FROM @TempAutoCalItems t1
            end
END
```

File parser 360 may also perform error checking operations on the file and generate errors and/alerts based on any errors that are encountered. For example, file integrity may be examined using a cyclic redundancy check (CRC).

Referring again to FIG. 4, apparatus management computing system may also include an application layer that includes monitor application 380. Monitor application accesses data stored in database 160 to provide administrator access to the extracted and/or processed for the remote monitoring and/or management of apparatus 110. Monitor application may include a user interface for presenting data to an administrative user, and optionally, for receiving management input from a user for the remote management of apparatus 110, as further described below. The user interface may be rendered on client device 170 (shown in FIGS. 1 and 3). Monitor application 380 may be accessed remotely for remote monitoring and management of apparatus 110, for example, using remote client device 180.

Figure 6:
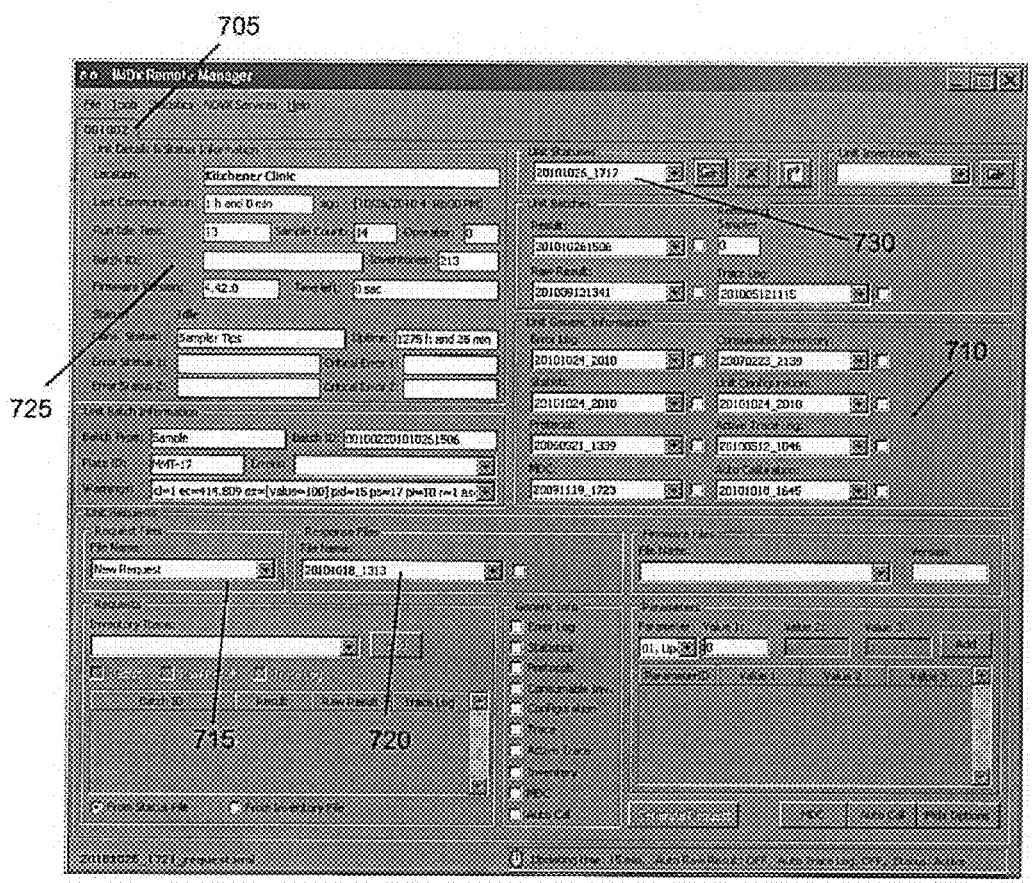
FIG. 6 is a screenshot of a monitor application that enables a user to monitor and/or manage a remote apparatus.

FIG. 6 is a screenshot showing a non-limiting example of a user interface implementation of monitor application 380, rendered as a web-based graphical user interface (GIU). The (GIU) contains a tab 705 for each instrument that the support staff is currently monitoring. This tab gives the support staff the ability to see the parsed information of the last status file including: uptime, time since last communication, run status, firmware version and error conditions. A set list boxes 710 gives the user the ability to view a history of any of the different types of files the unit may have sent in their original XML format. Users (e.g. support staff) can print, save or import into a spreadsheet any of these files. The users can also create a request file 715 from this screen to ask for a 'by request only' type of file, sent to the apparatus a new set of configuration commands or upload a new firmware load to the apparatus. Response files from the analyzer are shown in box 720.

The example monitor application user interface also allows for the monitoring a number of parameters for all apparatuses in box 725. Summaries of last communication time, calibration status, run history, and control data are available. Unit status files containing status information pertaining to an analyzer may be obtained in box 730.

In one embodiment, the system is adapted for the two-way transfer of files, and instruction files containing instructions to be carried out by apparatus 110 are provided by apparatus management computing system 150 through file transfer server 130, thus enabling the remote management and/or provisioning of apparatus 110 through file transfer. In such an embodiment, remote computing device 120 also includes a file monitoring service 350 and file parser service 360, and interrogates file transfer server 130 to search for new instruction files.

Instruction files may also be provided in a markup language, such as XML. A file monitor service 350 running on remote computing device 120 may search for new instruction files whenever uploading files to file transfer server 130. In one embodiment, an instruction file may indicate that specific information pertaining to the apparatus 110 is to be provided in a response file and uploaded to file transfer server 130.

In one embodiment, instruction files are generated by user interaction with monitor application 380. For example, if an error condition is detected by a user operating monitor application 380, the user may instruct monitor application 380 to prepare an instruction file indicating that apparatus 380 should be powered down. The instruction file is then transferred to file transfer server 130 by apparatus management computing system 150, after which it is detected and indirectly obtained by remote computing device 120. A file parsing service operating through remote computing device 120 then parses the instruction file, obtains the instruction to power down apparatus 110, and controls apparatus to perform the power down instruction.

Other forms of instructions may include providing new configuration and/or setup parameters to apparatus 110 for configuring one or more state parameters or variables. After having obtained such parameters through parsing an instruction file, remote computing device employs the parameters to re-configure apparatus 110. In yet another example yet non-limiting embodiment, the instruction file may include instructions for instructing remote computing device 120 to download new firmware, which may be provided from apparatus management computing system to file transfer server 130 for download by remote computing device 120.

In one embodiment, file parser 360 is configured to processes the file contents and determine whether or not an action is required according to an automated management function. For example, file parser 360 may processes a file obtained from file transfer server 130 by file monitor 350, and determine whether or not an error code exists. If an error code exists, file parser 360 automatically generates an instruction file, which is subsequently transferred to file transfer server by apparatus management computing system 150. Remote computing device, through its file monitor and file parser services, obtains the information file from file transfer server and carries out the instruction contained in the instruction file.

In a non-limiting example of the foregoing embodiment, file parser 360 may be programmed to generate an instruction file requesting additional information from analyzer 110 whenever an error condition is denoted within a parsed file. Additional information may include a more thorough status report, a list of configuration parameters, a full and/or recent usage history, and a list of recent results and/or measurements obtained. By automatically requesting and subsequently obtaining such information, diagnosis of a problem and/or resolution relating to an error condition may be achieved with greater speed and efficiency by an administrator interacting with the system through monitor application 380.

Referring again to FIG. 4, apparatus management computing system 150 may further include customer application 390, which may provide information regarding apparatus status to a non-administrative customer or operator. Customer application 390 may also be rendered as a user interface, and may be remotely accessed through network 140 (for example, as a web-based application). In one embodiment, customer application 390 also provides an interface that enables a customer or operator to access results measurements and/or results obtained from apparatus 110.

Figure 7:
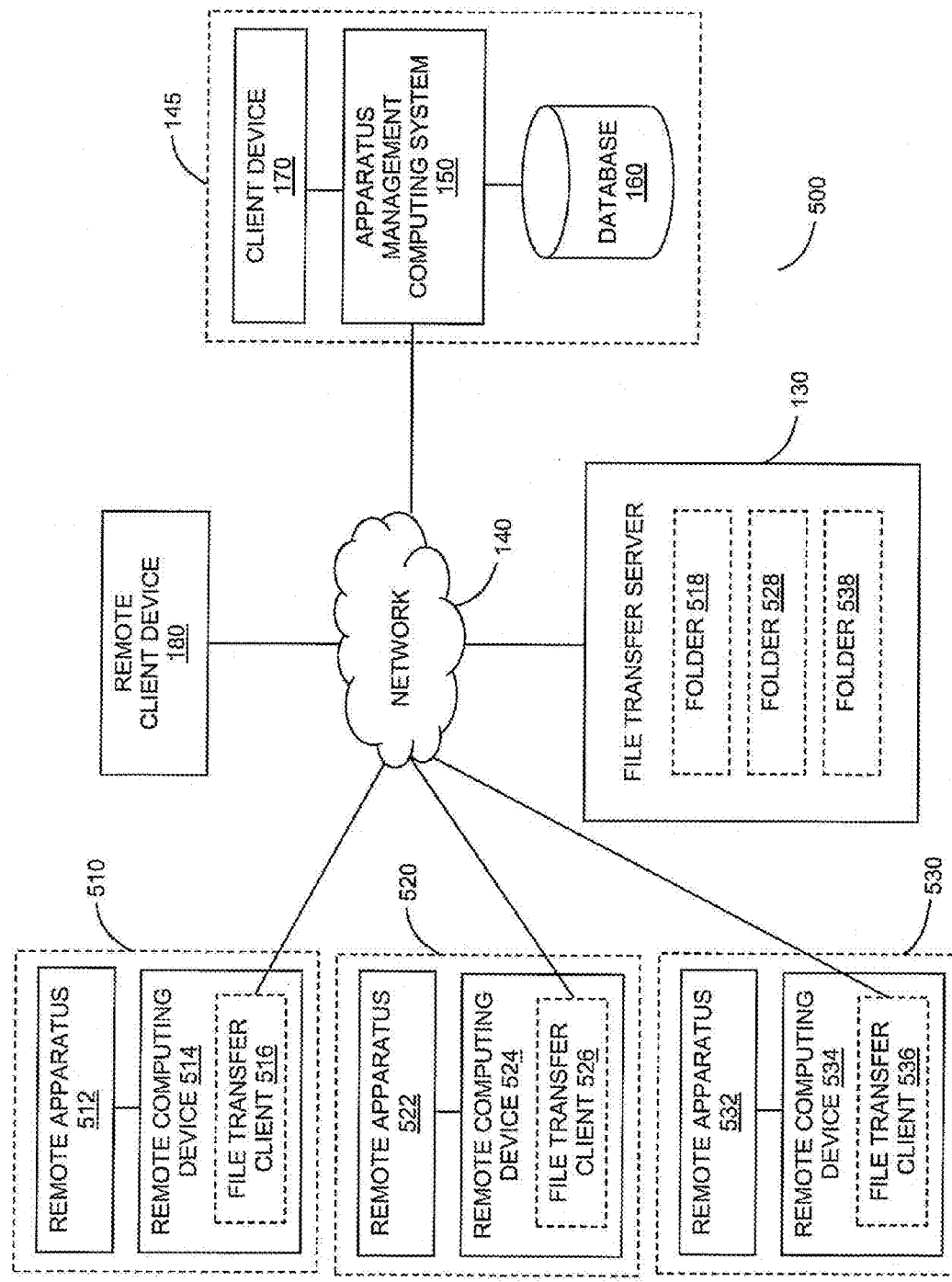
FIG. 7 shows a remote monitoring system involving multiple remote apparatuses.
Figure 8:
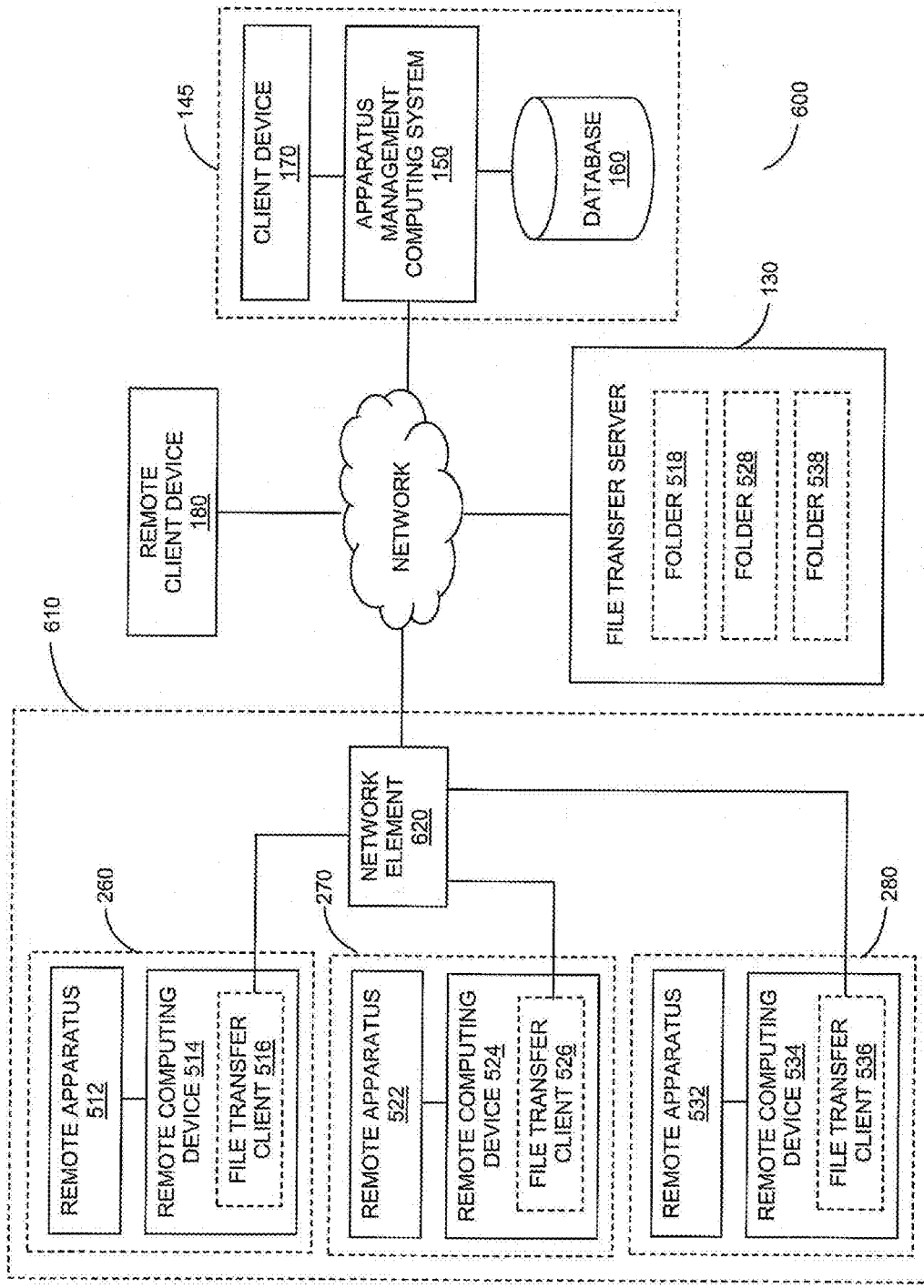
FIG. 8 shows a remote monitoring system involving multiple remote apparatuses, where the remote apparatuses reside on a local network.

While the aforementioned embodiments have focused on implementations involving a single apparatus 110, it is to be understood that the systems and methods disclosed above may be employed to monitor and/or manage a plurality of remote apparatus. FIG. 7 illustrates a multi-apparatus system 500 in which multiple remote subsystems 510, 520 and 530, each including remote apparatuses 512, 522 and 532, respectively, and remote computing devices 514, 524 and 534, respectively, are monitored and/or managed by apparatus management computing system 150. FIG. 8 illustrates a related system 600 in which remote subsystems 260, 270 and 280 reside within a local network 610, access wide area network 140 through a network element 620 such as a router and/or gateway.

Remote computing devices 514, 524 and 534 may be programmed with a specific apparatus identifier (such as serial number), a password for accessing file transfer server 130 if anonymous access is not employed, and path for accessing a given folder or set of subfolders within file transfer server 130. Each remote computing system may use the same address and password but may possess a unique account. If the file does not uniquely identify the remote apparatus, then each remote computing system may include a unique account.

Files related to each remote subsystem may be stored in unique, apparatus-specific folders. For example, in FIG. 7, files relating to apparatuses 512, 522 and 532 are stored in folders 518, 528, and 538, respectively. This embodiment provides a key architectural advantage: files relating to a specific apparatus may be identified by the folder structure alone, and it is not necessary to parse the file name or the file contents in order to determine the apparatus to which a given file pertains. Accordingly, the apparatus management computing system 150 need only know of the relationship between the folder structure of file transfer system 130 and the apparatuses, which yields a very simple and robust system for information sharing.

In another embodiment, the system may include more than one file transfer server. For example, different apparatuses may upload data to different file transfer servers, where the different file transfer servers are all centrally accessible by apparatus management and computing system 150.

The embodiments disclosed above provide flexible and efficient systems and methods for the remote monitoring and/or management of one or more remote apparatus. By indirectly transferring information to and from an intermediate file transfer server, a robust and scalable system is obtained and it is not necessary to configure and maintain a direct session between an apparatus and a central computing system. Furthermore, the minimal overhead associated with file transfer provides an efficient information transfer conduit without significant overhead that can otherwise reduce bandwidth. An added and important benefit of separating the transfer of information through the presence of the file transfer server is that both the apparatus and the apparatus management computing system can independently determine their preferred timing of when to communicate with the file transfer server, thereby each independently and optimally managing their respective bandwidth.

Although the above embodiments have disclosed systems and methods referring to "file transfer protocol", it is to be understood that this term is generic and can refer to one of many known file transfer protocols, and is not limited to FTP (a specific protocol also named "file transfer protocol"). Examples of file transfer protocols include RCP, Secure Copy, XMODEM, and peer-to-peer systems such as Bittorrent.

The following examples are presented to enable those skilled in the art to understand and to practice embodiments of the present disclosure. They should not be considered as a limitation on the scope of the present embodiments, but merely as being illustrative and representative thereof.

EXAMPLES

Example 1

Additional XML Files Generated by a Diagnostic Analyzer for Remote Monitoring

Error Log XML Format

```
<novxerror compression="">
 <header unitid="001009" mfg="2008/02/19" structureid="2"
 date="24/10/2010" time="20:10" crc="45848F5D" />
 <summary
 version="1"
 totalcount="151"
 lastentry="151"
 maxsaved="151"
 lastupdate="22/10/2010 11:01:03"
 />
 <logentry
 id="151"
 source="3"
 suborigin="16"
 batchid="00:00"
 toplevelflow="idle - throttle up bandwidth"
 timestamp="22/10/2010 10:19:59"
```

-continued

```
detail="Carousel tray latch sensor is un-latched while carousel door is
closed."
/>
<logentry
id="150"
source="9"
suborigin="1"
batchid="11:01"
toplevelflow="shutdown - batch info save"
timestamp="14/10/2010 11:58:28"
detail="The carousel stepper motor fault total count 410 - static motor
fault - encoder 2572 motor 2526 - other stage encoder 0 motor 0."
/>
<logentry
id="149"
source="3"
suborigin="16"
batchid="00:00"
toplevelflow="idle - throttle up bandwidth"
timestamp="14/10/2010 02:10:09"
detail="Carousel tray latch sensor is un-latched while carousel door is
closed."
/>
<logentry
id="148"
source="3"
suborigin="16"
batchid="00:00"
toplevelflow="idle - throttle up bandwidth"
timestamp="13/10/2010 09:46:12"
detail="Carousel tray latch sensor is un-latched while carousel door is
closed."
/>
<logentry
id="147"
source="8"
suborigin="8"
batchid="00:00"
toplevelflow="idle - no batch running"
timestamp="12/10/2010 13:36:39"
detail="System was powered up count 17 times."
/>
```

Mechanical Statistics

```
<novxstatistics compression="">
 <header unitid="001009" mfg="2008/02/19" structureid="4"
date="24/10/2010" time="20:10" crc="84E2736F" />
 <statistics version="1" />
 <system>
  <__init power-ups="17" six-month-service="203896932" />
  <temperature>
   <cooler center="28.3" />
   <oven left="31.5" />
   <level-one back="26.6" right="26.3" front="26.2" left="26.5" />
  </temperature>
 </system>
 <lamp minutes="5214" activations="12045" replacements="0" />
 <pipettes>
  <__8ch tip-pickups="1894" pickup-err="10" dropoff-err="1" aspirate-
vol="3733090" aspirate-cnt="44806" dispense-cnt="77484" display-
cycles="3600" maintenance-cnt="0" maintenance-display-cycles="2900"
signal-recovery="0" hardware-failures="0" />
  <__1ch tip-pickups="46770" pickup-err="24" dropoff-err="68" aspirate-
vol="907153" aspirate-cnt="130783" dispense-cnt="238796" display-
cycles="4700" maintenance-cnt="0" maintenance-display-cycles="3900"
signal-recovery="0" hardware-failures="0" />
 </pipettes>
 <punch punchcount="16310" drop-punch="0" pick-up-punch="0"
punch-detect-retry="0" />
 <tipdetect-hw hw-err="0" />
 <vortex timelevel2="251578" />
 <barcode-readers>
  <analyzer readfail="0" />
  <sampler readfail="0" />
 </barcode-readers>
 <ise phmeasure="1341" replacements="1" />
 <stepper-motors>
  <ag2 actuation="5886" distance="2611" fault="0" />
  <ag3 actuation="4" distance="0" fault="0" />
  <f1 actuation="16650" distance="14841" fault="0" />
  <f2 actuation="0" distance="0" fault="0" />
  <elev-y actuation="467591" distance="24883459" fault="0" />
  <elev-z actuation="433622" distance="29290946" fault="2" />
  <opt-x actuation="288975" distance="44981394" fault="0" />
  <opt-y actuation="324445" distance="13760183" fault="0" />
  <ldr-y actuation="14436" distance="2745825" fault="0" />
  <__8ch-x actuation="153588" distance="21703960" fault="0" />
  <__8ch-z actuation="349983" distance="52641331" fault="0" />
  <carousel actuation="385577" distance="261578" fault="421" />
  <__1ch-x actuation="897284" distance="108344125" fault="3" />
  <__1ch-z actuation="1123671" distance="63690476" fault="1" />
  <ise-x actuation="255120" distance="25096169" fault="4" />
  <ise-z actuation="1472139" distance="97049871" fault="2" />
 </stepper-motors>
</novxstatistics>
```

Run Trace Log

```
<novxactivetrace compression=""><header
batchid="001009201010061056"
structureid="1" date="06/10/2010" time="10:56" crc="D95CC182"
/><activetracelog>
| Assay Batch Start
| ACS Command Done
| Tip Rack - standard tip operation
| [0.01] Asy=1005 Name="EDDP Sample" Ver=13
| [0.02] Asy=1005 Name="EDDP Sample" Ver=13
| [0.03] Asy=1505 Name="Creatinine Sample" Ver=11
| [0.04] Asy=1505 Name="Creatinine Sample" Ver=11
| [0.05] Asy=1607 Name="Oxycodone Sample Diluted 2" Ver=11
| [0.06] Asy=1607 Name="Oxycodone Sample Diluted 2" Ver=11
| [0.07] Asy=1106 Name="BZG Sample II" Ver=2
| [0.08] Asy=1106 Name="BZG Sample II" Ver=2
| [0.09] Asy=1305 Name="BZO Sample" Ver=12
| [0.10] Asy=1305 Name="BZO Sample" Ver=12
|
| Unit: 001009
| Date: 2010/10/06 10:17
| Pass: Run
| S.Tips:
| ReagCtl: n=4 cal1=0 cal2=0
| SetPlateWellMap
|  1ch tip next: 1
|  1ch tip assigned: 1
|  1ch tip next: 2
|  1ch tip assigned: 2
|  1ch tip next: 3
|  1ch tip assigned: 3
|  1ch tip next: 4
|  1ch tip assigned: 4
|  1ch tip next: 5
|  1ch tip assigned: 5
|  1ch tip next: 6
|  1ch tip assigned: 6
|  1ch tip next: 7
|  1ch tip assigned: 7
|  1ch tip next: 8
|  1ch tip assigned: 8
|  1ch tip next: 9
|  1ch tip assigned: 9
|  1ch tip next: 10
|  1ch tip assigned: 10
|  1ch tip next: 11
|  1ch tip assigned: 11
|  1ch tip next: 12
|  1ch tip assigned: 12
|  1ch tip next: 13
|  1ch tip assigned: 13
|  1ch tip next: 14
|  1ch tip assigned: 14
| Mapped Container Count = 14
| S.Tips: 1:1 2:1 3:1 4:1 5:1 6:1 7:1 8:1 9:1 10:1 11:1 12:1 13:1 14:1
|  CheckDevice dev=1 co=2 um=1 uc=1
```

-continued

```
| "8Ch Pipette" dev=1 status=0 dev-present=46024 dev-ok=1 dbg1=0
| CheckDevice dev=0 co=2 um=1 uc=1
| "1Ch Pipette" dev=1 status=0 dev-present=46752 dev-ok=1 dbg1=0
| Validation Time: 2.118
| Set Batch Priority 29 (err=0)
| EDDP Low Limit set
|
| Start Temperatures, time=2225
|   cooler = 283
|   oven left = 317
|   back = 271
|   front = 267
|   left = 270
|   right = 268
|
|    DEFAULT TIME START 2.225
|
| Wait for ACD READY - before starting batch
|    Verify level 1 temperature
|
|    pipette exercise t=2.233
|    start 8 ch
|    start 1 ch
| req-action=14
|    wait for 8 ch
|      wait ACD (acs) max=1377 t=2.236
|      wait CCD pip max=1217 t=2.260
|      wait CCD updated t=2.260
|      wait ACD updated t=2.276
|      wait CCD pip max=1257 t=2.339
|      wait ACD pip max=1257 t=2.365
PIP1 1199406 ParseMsg display step pos 200 req pos 200 asp 3 dsp 3
|      wait ACD pip max=1257 t=4.654
PIP2 1199508 ParseMsg display step pos 190 req pos 190 asp 3 dsp 3
|      wait CCD pip max=1259 t=4.694
PIP1 1201624 ParseMsg display step pos 30 req pos 30 asp 3 dsp 3
|      wait ACD pip max=1259 t=6.854
PIP1 1201703 ParseMsg display step pos 30 req pos 30 asp 3 dsp 3
|      wait CCD pip max=1261 t=6.957
PIP1 1203872 ParseMsg display step pos 200 req pos 200 asp 3 dsp 3
|      wait ACD pip max=1261 t=9.124
PIP2 1204144 ParseMsg display step pos 190 req pos 190 asp 3 dsp 3
|      wait CCD pip max=1264 t=9.402
PIP1 1206091 ParseMsg display step pos 30 req pos 30 asp 3 dsp 3
|      wait ACD pip max=1263 t=11.324
PIP2 1206385 ParseMsg display step pos 30 req pos 30 asp 3 dsp 3
|      wait CCD pip max=1266 t=11.654
PIP1 1208362 ParseMsg display step pos 200 req pos 200 asp 3 dsp 3
|      wait ACD pip max=1266 t=13.614
PIP2 1208826 ParseMsg display step pos 190 req pos 190 asp 3 dsp 3
|      wait CCD pip max=1268 t=14.099
PIP1 1210580 ParseMsg display step pos 30 req pos 30 asp 3 dsp 3
|      wait ACD pip max=1268 t=15.816
PIP2 1211067 ParseMsg display step pos 30 req pos 30 asp 3 dsp 3
|      wait CCD pip max=1271 t=16.260
PIP1 1212998 ParseMsg display step pos 200 req pos 200 asp 3 dsp 3
|      wait ACD pip max=1270 t=18.184
PIP2 1213462 ParseMsg display step pos 190 req pos 190 asp 3 dsp 3
|      wait CCD pip max=1273 t=18.705
PIP1 1215193 ParseMsg display step pos 30 req pos 30 asp 3 dsp 3
|      wait ACD pip max=1273 t=20.387
PIP2 1215681 ParseMsg display step pos 30 req pos 30 asp 3 dsp 3
|      wait CCD pip max=1275 t=20.866
PIP1 1217441 ParseMsg display step pos 200 req pos 200 asp 3 dsp 3
|      wait ACD pip max=1275 t=22.676
PIP2 1218076 ParseMsg display step pos 190 req pos 190 asp 3 dsp 3
|      wait CCD pip max=1278 t=23.311
PIP1 1219659 ParseMsg display step pos 30 req pos 30 asp 3 dsp 3
|      wait ACD pip max=1277 t=24.868
PIP2 1220294 ParseMsg display step pos 30 req pos 30 asp 3 dsp 3
|      wait CCD pip max=1280 t=25.483
PIP1 1222109 ParseMsg display step pos 200 req pos 200 asp 3 dsp 3
|      wait ACD pip max=1279 t=27.335
PIP2 1222690 ParseMsg display step pos 190 req pos 190 asp 3 dsp 3
|      wait CCD pip max=1282 t=27.928
PIP1 1224304 ParseMsg display step pos 30 req pos 30 asp 3 dsp 3
|      wait ACD pip max=1282 t=29.526
PIP2 1224908 ParseMsg display step pos 30 req pos 30 asp 3 dsp 3
|      wait CCD pip max=1284 t=30.179
PIP1 1226552 ParseMsg display step pos 200 req pos 200 asp 3 dsp 3
|      wait ACD pip max=1284 t=31.815
PIP2 1227349 ParseMsg display step pos 190 req pos 190 asp 3 dsp 3
|      wait CCD pip max=1287 t=32.535
PIP1 1228794 ParseMsg display step pos 30 req pos 30 asp 3 dsp 3
|      wait ACD pip max=1286 t=34.016
|    wait for 1 ch
|      wait CCD (acs) max=180 t=34.107
PIP2 1229544 ParseMsg display step pos 30 req pos 30 asp 3 dsp 3
|      wait CCD pip max=1289 t=34.799
|      wait done t=34.880
|    pipette exercise done t=34.880
|
| S.Tips: 1:1 2:1 3:1 4:1 5:1 6:1 7:1 8:1 9:1 10:1 11:1 12:1 13:1 14:1
| MaxRows=12 Running=1
| (1)PS=1 RW=1 PPCmd=8000, D=1, T=34.887
|    BGND Light Check ppcd=1 r=1
|
|    MovePI:PO(3)->LVL1
|    acs move tray, pl=po(3) LVL2->LVL1 t=34.893
|    call acd move tray 1->0 det=0x0
|    acs move tray done t=38.349 el=3.456
|    ACS: 1R=PO(3) 3R=PR(1) 5R=TP(5) 6R=sr(2)
|
|    move elev. - pos=1, dst=3, stpd=1
|    acs move tray, pl=__(0) LVL7->LVL3 t=38.358
|    call acd move tray 6->2 det=0x0
|    acs move tray done t=41.519 el=3.161
|    ACS: 1R=PO(3) 3R=PR(1) 5R=TP(5) 6R=sr(2)
|    photo mv r=1 c=8 t=41.523 trp=1 om=0
|    wait ACD (acs) max=1276 t=41.525
|      photo-rd -8.6632562E+001 (AB1 630 8)
| (1)PS=1 T=45.421 D=10.534
|
| (1)PS=1 RW=2 PPCmd=8000, D=1, T=45.436
|    BGND Light Check ppcd=1 r=2
|
|    MovePI:PO(3)->LVL1
|    pl:3 - already at dst
|
|    move elev. - pos=3, dst=3, stpd=1
|    photo mv r=2 c=8 t=45.442 trp=1 om=0
|    wait ACD (acs) max=1280 t=45.444
|      photo-rd -8.6523284E+001 (AB2 610 16)
| (1)PS=1 T=47.196 D=1.760
|
| (1)PS=1 RW=3 PPCmd=8000, D=1, T=47.211
|    BGND Light Check ppcd=1 r=3
|
|    MovePI:PO(3)->LVL1
|    pl:3 - already at dst
|
|    move elev. - pos=3, dst=3, stpd=1
|    photo mv r=3 c=8 t=47.218 trp=1 om=0
|    wait ACD (acs) max=1282 t=47.219
|      photo-rd -8.6610634E+001 (AB3 611 24)
| (1)PS=1 T=48.985 D=1.774
|
| (1)PS=1 RW=4 PPCmd=8000, D=1, T=49.001
|    BGND Light Check ppcd=1 r=4
|
|    MovePI:PO(3)->LVL1
|    pl:3 - already at dst
|
|    move elev. - pos=3, dst=3, stpd=1
|    photo mv r=4 c=8 t=49.008 trp=1 om=0
|    wait ACD (acs) max=1283 t=49.010
|      photo-rd -8.6476990E+001 (AB4 610 32)
| (1)PS=1 T=50.781 D=1.780
|
| (1)PS=1 RW=5 PPCmd=8000, D=1, T=50.796
|    BGND Light Check ppcd=1 r=5
|
|    MovePI:PO(3)->LVL1
|    pl:3 - already at dst
|
|    move elev. - pos=3, dst=3, stpd=1
|    photo mv r=5 c=8 t=50.803 trp=1 om=0
|    wait ACD (acs) max=1285 t=50.805
```

-continued

```
|    photo-rd −8.6317039E+001 (AB5 590 40)
| (1)PS=1 T=52.559 D=1.763
|
| (1)PS=1 RW=6 PPCmd=8000, D=1, T=52.573
|  BGND Light Check ppcd=1 r=6
|
|  MovePI:PO(3)->LVL1
|    pl:3 - already at dst
|
|  move elev. - pos=3, dst=3, stpd=1
|  photo mv r=6 c=8 t=52.580 trp=1 om=0
|  wait ACD (acs) max=1287 t=52.582
|    photo-rd −8.6128743E+001 (AB6 569 48)
| (1)PS=1 T=54.276 D=1.703
|
| (1)PS=1 RW=7 PPCmd=8000, D=1, T=54.291
|  BGND Light Check ppcd=1 r=7
|
|  MovePI:PO(3)->LVL1
|    pl:3 - already at dst
|
|  move elev. - pos=3, dst=3, stpd=1
|  photo mv r=7 c=8 t=54.298 trp=1 om=0
|  wait ACD (acs) max=1289 t=54.300
|    photo-rd −8.6157602E+001 (AB7 569 56)
| (1)PS=1 T=56.005 D=1.714
|
| (1)PS=1 RW=8 PPCmd=8000, D=1, T=56.020
|  BGND Light Check ppcd=1 r=8
|
|  MovePI:PO(3)->LVL1
|    pl:3 - already at dst
|
|  move elev. - pos=3, dst=3, stpd=1
|  photo mv r=8 c=8 t=56.028 trp=1 om=0
|  wait ACD (acs) max=1290 t=56.029
|    photo-rd −8.5960582E+001 (AB8 551 64)
| (1)PS=1 T=57.715 D=1.695
|
| (1)PS=1 RW=9 PPCmd=8000, D=1, T=57.730
|  BGND Light Check ppcd=1 r=9
|
|  MovePI:PO(3)->LVL1
|    pl:3 - already at dst
|
|  move elev. - pos=3, dst=3, stpd=1
|  photo mv r=9 c=8 t=57.736 trp=1 om=0
|  wait ACD (acs) max=1292 t=57.738
|    photo-rd −8.6450787E+001 (AB9 611 72)
| (1)PS=1 T=59.489 D=1.759
|
| (1)PS=1 RW=10 PPCmd=8000, D=1, T=59.504
|  BGND Light Check ppcd=1 r=10
|
|  MovePI:PO(3)->LVL1
|    pl:3 - already at dst
|
|  move elev. - pos=3, dst=3, stpd=1
|  photo mv r=10 c=8 t=59.510 trp=1 om=0
|  wait ACD (acs) max=1294 t=59.512
|    photo-rd −8.6421538E+001 (AB10 591 80)
| (1)PS=1 T=61.269 D=1.765
|
|  Get Punch List
|  Punch List 0xF9F pl=1
|  PriReagPunchList 0xF9F
|  Get Punch List
|  Punch List 0x0 pl=2
| (2)PS=2 PI=1 RW=1 T=61.411
|  Asy=1005 "EDDP Sample"
|  CMD - vortex(6)
|    dur=15 temp=0 vs=100 vm=1 tc=0 pl=1
|    max vrtx spd 600 (200 1200)
|
|  MovePI:PR(1)->LVL2
|  acs move tray, pl=pr(1) LVL3->LVL2 t=61.420
|    photo home t=61.423
|    photo home done (x=0 y=250 t=65.541)
|  call acd move tray 2->1 det=0x0
|  acs move tray done t=69.687 el=8.267
|  ACS: 1R=PO(3) 2R=PR(1) 5R=TP(5) 6R=sr(2)
|
```

Results File

```
<novxresults compression="">
 <header
  batchid="001009201010270843"
  structureid="7"
  date="27/10/2010"
  time="09:42"
  crc="FFBDF94E" />
 <status
  plateid="MMT-17 EDDP BZO BZG OPI CRE (5062)"
  calibration="recalibrate Not Required"
  operatorid="1"
  status="0"
  errors=""
  warnings="cl=1 ec=414.809 ex=[value=100] pid=15 ps=17 pi=10 r=1
as=5062.1005 R:cl=1 ec=414.809 ex=[value=100] pid=15 ps=17 pi=10 r=2
as=5062.1005 R"
  information=" calculation status 1 : calibration status 4"
  batchtype="0"
  duration="56.8"
  samplecount="13"
  controlcount="1"
  remainingsamplecount="0"
  fwmain="4.42.0" />
 <consumables
  reagentbcsn="0040172609"
  reagentbn="1252"
  reactionbcsn="0020146840"
  tipbcsn="0060020387"
  isectrl1bcsn="0080092125"
  isectrl2bcsn="0140045974"
  isectrl3bcsn="0080091400"
 />
 <consumablestatus consumablestoreplace="32" reag1="2" reag2="0" reac1="2"
reac2="12" tipr="2" stip="0" sdis="0" sisecal="0" sisewash="0" siserinse="0" />
```

```
<probefault
phfault="0"
nafault="0"
kfault="0"
clfault="0"
/>
<ph
phalpha1="+55.0"
phbeta1="+7.0"
phalpha2="+55.0"
phbeta2="+7.0"
/>
<na
naalpha1="+0.0"
nabeta1="+0.0"
naalpha2="+0.0"
nabeta2="+0.0"
/>
<k
kalpha1="+0.0"
kbeta1="+0.0"
kalpha2="+0.0"
kbeta2="+0.0"
/>
<cl
clalpha1="+0.0"
clbeta1="+0.0"
clalpha2="+0.0"
clbeta2="+0.0"
/>
<sampleresult sampleid="3722610" samplepos="2">
<test testid="1005" result="3454" units="ng/ml" cutoffstatus="positive" flag="0" />
<test testid="1106" result="0" units="ng/ml" cutoffstatus="negative" flag="0" />
<test testid="1205" result="698" units="ng/ml" cutoffstatus="positive" flag="0" />
<test testid="1305" result="76" units="ng/ml" cutoffstatus="negative" flag="0" />
<test testid="1505" result="213.1" units="mg/dL" cutoffstatus="normal" flag="0" />
<test testid="4003" result="5.2" cutoffstatus="normal" flag="0" />
</sampleresult>
<sampleresult sampleid="3722055" samplepos="3">
<test testid="1005" result="3417" units="ng/ml" cutoffstatus="positive" flag="0" />
<test testid="1106" result="0" units="ng/ml" cutoffstatus="negative" flag="0" />
<test testid="1205" result="59" units="ng/ml" cutoffstatus="negative" flag="0" />
<test testid="1305" result="29" units="ng/ml" cutoffstatus="negative" flag="0" />
<test testid="1505" result="136.3" units="mg/dL" cutoffstatus="normal" flag="0" />
<test testid="4003" result="6.7" cutoffstatus="normal" flag="0" />
</sampleresult>
<sampleresult sampleid="3721701" samplepos="4">
<test testid="1005" result="5702" units="ng/ml" cutoffstatus="positive" flag="0" />
<test testid="1106" result="0" units="ng/ml" cutoffstatus="negative" flag="0" />
<test testid="1205" result="292" units="ng/ml" cutoffstatus="negative" flag="0" />
<test testid="1305" result="61" units="ng/ml" cutoffstatus="negative" flag="0" />
<test testid="1505" result="144.8" units="mg/dL" cutoffstatus="normal" flag="0" />
<test testid="4003" result="5.6" cutoffstatus="normal" flag="0" />
</sampleresult>
<sampleresult sampleid="3721660" samplepos="5">
<test testid="1005" result="1486" units="ng/ml" cutoffstatus="positive" flag="0" />
<test testid="1106" result="7" units="ng/ml" cutoffstatus="negative" flag="0" />
<test testid="1205" result="0" units="ng/ml" cutoffstatus="negative" flag="0" />
<test testid="1305" result="0" units="ng/ml" cutoffstatus="negative" flag="0" />
<test testid="1505" result="26.8" units="mg/dL" cutoffstatus="normal" flag="0" />
<test testid="4003" result="6.2" cutoffstatus="normal" flag="0" />
</sampleresult>
<sampleresult sampleid="3722544" samplepos="6">
<test testid="1005" result="12000" units="ng/ml" cutoffstatus="positive" flag="0" />
<test testid="1106" result="3912" units="ng/ml" cutoffstatus="positive" flag="0" />
<test testid="1205" result="390" units="ng/ml" cutoffstatus="positive" flag="0" />
<test testid="1305" result="101" units="ng/ml" cutoffstatus="negative" flag="0" />
<test testid="1505" result="248.5" units="mg/dL" cutoffstatus="normal" flag="0" />
```

```
/>
  <test testid="4003" result="6.7" cutoffstatus="normal" flag="0" />
</sampleresult>
<sampleresult sampleid="3721849" samplepos="7">
  <test testid="1005" result="5353" units="ng/ml" cutoffstatus="positive" flag="0"
/>
  <test testid="1106" result="371" units="ng/ml" cutoffstatus="positive" flag="0" />
  <test testid="1205" result="226" units="ng/ml" cutoffstatus="negative" flag="0"
/>
  <test testid="1305" result="35" units="ng/ml" cutoffstatus="negative" flag="0" />
  <test testid="1505" result="136.3" units="mg/dL" cutoffstatus="normal" flag="0"
/>
  <test testid="4003" result="5.8" cutoffstatus="normal" flag="0" />
</sampleresult>
<sampleresult sampleid="3721852" samplepos="8">
  <test testid="1005" result="11130" units="ng/ml" cutoffstatus="positive" flag="0"
/>
  <test testid="1106" result="9" units="ng/ml" cutoffstatus="negative" flag="0" />
  <test testid="1205" result="2" units="ng/ml" cutoffstatus="negative" flag="0" />
  <test testid="1305" result="108" units="ng/ml" cutoffstatus="negative" flag="0"
/>
  <test testid="1505" result="259.7" units="mg/dL" cutoffstatus="normal" flag="0"
/>
  <test testid="4003" result="5.8" cutoffstatus="normal" flag="0" />
</sampleresult>
<sampleresult sampleid="3722137" samplepos="9">
  <test testid="1005" result="4640" units="ng/ml" cutoffstatus="positive" flag="0"
/>
  <test testid="1106" result="9" units="ng/ml" cutoffstatus="negative" flag="0" />
  <test testid="1205" result="0" units="ng/ml" cutoffstatus="negative" flag="0" />
  <test testid="1305" result="35" units="ng/ml" cutoffstatus="negative" flag="0" />
  <test testid="1505" result="66.0" units="mg/dL" cutoffstatus="normal" flag="0" />
  <test testid="4003" result="7.1" cutoffstatus="normal" flag="0" />
</sampleresult>
<sampleresult sampleid="3722174" samplepos="10">
  <test testid="1005" result="5383" units="ng/ml" cutoffstatus="positive" flag="0"
/>
  <test testid="1106" result="56" units="ng/ml" cutoffstatus="negative" flag="0" />
  <test testid="1205" result="26" units="ng/ml" cutoffstatus="negative" flag="0" />
  <test testid="1305" result="43" units="ng/ml" cutoffstatus="negative" flag="0" />
  <test testid="1505" result="100.7" units="mg/dL" cutoffstatus="normal" flag="0"
/>
  <test testid="4003" result="6.8" cutoffstatus="normal" flag="0" />
</sampleresult>
<sampleresult sampleid="3721778" samplepos="11">
  <test testid="1005" result="12000" units="ng/ml" cutoffstatus="positive" flag="0"
/>
  <test testid="1106" result="14" units="ng/ml" cutoffstatus="negative" flag="0" />
  <test testid="1205" result="685" units="ng/ml" cutoffstatus="positive" flag="0" />
  <test testid="1305" result="49" units="ng/ml" cutoffstatus="negative" flag="0" />
  <test testid="1505" result="148.1" units="mg/dL" cutoffstatus="normal" flag="0"
/>
  <test testid="4003" result="7.0" cutoffstatus="normal" flag="0" />
</sampleresult>
<sampleresult sampleid="3722085" samplepos="12">
  <test testid="1005" result="12000" units="ng/ml" cutoffstatus="positive" flag="0"
/>
  <test testid="1106" result="0" units="ng/ml" cutoffstatus="negative" flag="0" />
  <test testid="1205" result="1" units="ng/ml" cutoffstatus="negative" flag="0" />
  <test testid="1305" result="62" units="ng/ml" cutoffstatus="negative" flag="0" />
  <test testid="1505" result="120.3" units="mg/dL" cutoffstatus="normal" flag="0"
/>
  <test testid="4003" result="5.5" cutoffstatus="normal" flag="0" />
</sampleresult>
<sampleresult sampleid="3721690" samplepos="13">
  <test testid="1005" result="12000" units="ng/ml" cutoffstatus="positive" flag="0"
/>
  <test testid="1106" result="8" units="ng/ml" cutoffstatus="negative" flag="0" />
  <test testid="1205" result="9" units="ng/ml" cutoffstatus="negative" flag="0" />
  <test testid="1305" result="584" units="ng/ml" cutoffstatus="positive" flag="0" />
  <test testid="1505" result="213.9" units="mg/dL" cutoffstatus="normal" flag="0"
/>
  <test testid="4003" result="5.3" cutoffstatus="normal" flag="0" />
</sampleresult>
<sampleresult sampleid="3722088" samplepos="14">
  <test testid="1005" result="3783" units="ng/ml" cutoffstatus="positive" flag="0"
/>
  <test testid="1106" result="14" units="ng/ml" cutoffstatus="negative" flag="0" />
  <test testid="1205" result="0" units="ng/ml" cutoffstatus="negative" flag="0" />
```

-continued

```
<test testid="1305" result="54" units="ng/ml" cutoffstatus="negative" flag="0" />
<test testid="1505" result="116.6" units="mg/dL" cutoffstatus="normal" flag="0" />
<test testid="4003" result="6.9" cutoffstatus="normal" flag="0" />
</sampleresult>
<controlresult controlbcsn="100104461" controlpos="1">
 <ctest ctestid="1106" cresult="196" cunits="ng/ml" ccutoffstatus="negative" cflag="0" expected="278" />
 <ctest ctestid="1305" cresult="283" cunits="ng/ml" ccutoffstatus="negative" cflag="0" expected="320" />
 <ctest ctestid="1205" cresult="312" cunits="ng/ml" ccutoffstatus="positive" cflag="0" expected="299" />
 <ctest ctestid="1005" cresult="82" cunits="ng/ml" ccutoffstatus="negative" cflag="0" expected="95" />
 <ctest ctestid="1505" cresult="19.9" cunits="mg/dL" ccutoffstatus="abnormal" cflag="0" expected="19.8" />
</controlresult>
</novxresults>
```

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A computer implemented method of remotely monitoring a remote apparatus;
    wherein the remote apparatus is locally associated with a remote computing device, and wherein the remote computing device is connected, through an external network, to a file transfer server, and wherein the remote computing device is configured to upload files associated with the remote apparatus to the file transfer server through a file transfer protocol;
    the method comprising:
        initiating, from a computing system that is remote from the remote apparatus, a file transfer session with the file transfer server;
        identifying, on the file transfer server, a file associated with the remote apparatus, the file having been uploaded to the file transfer server by the remote computing device associated with the remote apparatus through a file transfer protocol;
        requesting transfer of the file from the file transfer server to the computing system through the file transfer protocol;
        downloading the file to the computing system through the file transfer protocol; and
        processing the file on the computing system to extract information associated with the remote apparatus;
    such that the remote apparatus is monitored, through files residing on the file transfer server, without requiring direct communication between the computing system and the remote computing device associated with the remote apparatus, and without processing of the contents of the files by the file transfer server.

2. The method according to claim 1 further comprising the steps of:
    processing the information to determine the status of the remote apparatus.

3. The method according to claim 1 wherein the step of identifying the file residing on the file transfer server includes identifying a newly uploaded file.

4. The method according to claim 1 further comprising the step of identifying, based on the information, the remote apparatus to which the file pertains.

5. The method according to claim 1 further comprising the step of identifying, based on a folder in which the file resides, a remote apparatus to which the file pertains.

6. The method according to claim 2 further comprising the step of identifying an error condition associated with the remote apparatus.

7. The method according to claim 6 further comprising reporting the error condition to a user.

8. The method according to claim 2 further comprising the steps of:
    determining one or more instructions to be provided to the remote apparatus based on the status;
    generating an instruction file containing the instructions; and
    uploading the instruction file to the file transfer server for subsequent downloading by the remote computing device.

9. The method according to claim 8 wherein the information within the file is provided in the form of a markup language.

10. The method according to claim 1 further comprising the step of storing the information in a database.

11. The method according to claim 1 further comprising the steps of providing the information to a user through a user interface.

12. The method according to claim 1 wherein at least a portion of the information is selected from the group consisting of apparatus status information, activity history information, configuration parameters, setup parameters, diagnostic monitoring information, error codes, fault status information, information related to use, use statistics, results of calculations, results of measurements, a firmware version, and apparatus identification information.

13. A computer implemented method of managing a remote apparatus;
    wherein the remote apparatus is locally associated with a remote computing device, and wherein the remote computing device is connected, through an external network, to a file transfer server, and wherein the remote computing device is configured to upload files associated with the remote apparatus to the file transfer server through a file transfer protocol;
    the method comprising the steps of:
        initiating, from a computing system that is remote from the remote apparatus, a file transfer session with the file transfer server;

uploading an instruction file to the file transfer server, wherein the instruction file includes one or more instructions to be carried out by a remote computing device locally associated with the remote apparatus;

wherein the instruction file is identifiable to the remote computing device and downloadable from the file transfer server by the remote computing device;

such that the instruction file can be provided to the remote apparatus without requiring direct communication between the computing system and the remote computing device associated with the remote apparatus, and without processing of the contents of the instruction file by the file transfer server.

14. The method according to claim 13 wherein the remote apparatus associated with the instruction file is identifiable by the remote computing device according to information provided in the instruction file.

15. The method according to claim 13 wherein the remote apparatus associated with the instruction file is identifiable by the remote computing device according to a folder in which the instruction file resides.

16. The method according to claim 13 wherein the instruction file includes instructions selected from the group consisting of commands for performing one or more actions with or to the remote apparatus, instructions to download new firmware, and instructions to reconfigure the remote apparatus according to one or more parameters.

17. A computer implemented method of remotely monitoring a remote apparatus;

wherein the remote apparatus is locally associated with a remote computing device, and wherein the remote computing device is connected, through an external network, to a file transfer server;

the method comprising:

monitoring the remote apparatus via a computing device locally associated with the remote apparatus;

generating a file including information associated with the remote apparatus;

initiating a file transfer session with the file transfer server; and uploading the file to the file transfer server;

such that information associated with the remote apparatus is obtainable by a computing system remote from the remote apparatus, through files residing on the file transfer server, without requiring direct communication between the computing system and the remote computing device associated with the remote apparatus, and without processing of the contents of the files by the file transfer server.

18. The method according to claim 17 wherein at least a portion of the information is selected from the group consisting of apparatus status information, activity history information, configuration parameters, setup parameters, diagnostic monitoring information, error codes, fault status information, information related to use, use statistics, results of calculations, results of measurements, a firmware version, and apparatus identification information.

19. A system for monitoring a remote apparatus, the system comprising:

a file transfer server for communicating across an external network with a remote computing device locally associated with the remote apparatus, and for receiving a file uploaded from the remote computing device, wherein the file pertains to the remote apparatus; and a computing system remote from the remote apparatus for communicating with said file transfer server to identify and download the file, and to process the file and extract information associated with the remote apparatus;

such that information associated with the remote apparatus is obtainable by said computing system, through files residing on said file transfer server, without requiring direct communication between said computing system and the remote computing device associated with the remote apparatus, and without processing of the contents of the files by said file transfer server.

20. The system according to claim 19 wherein said file transfer server includes one or more folders, and wherein each folder is associated with a unique remote apparatus.

21. The system according to claim 19 wherein said computing system is configured to provide the information to a remote client.

22. The system according to claim 19 wherein said computing system is configured to process the information to determine a status of the remote apparatus.

23. The system according to claim 22 wherein said computing system is configured to:

determine one or more instructions to be provided to the remote apparatus based on the status;

generate an instruction file containing the instructions; and upload the instruction file to said file transfer server for subsequent downloading by the remote computing device.

24. The system according to claim 19 further comprising the remote computing device.

* * * * *